J. MATHISON.
CONFECTIONERY COATING MACHINE.
APPLICATION FILED DEC. 30, 1911.

1,032,014.

Patented July 9, 1912.
4 SHEETS—SHEET 1.

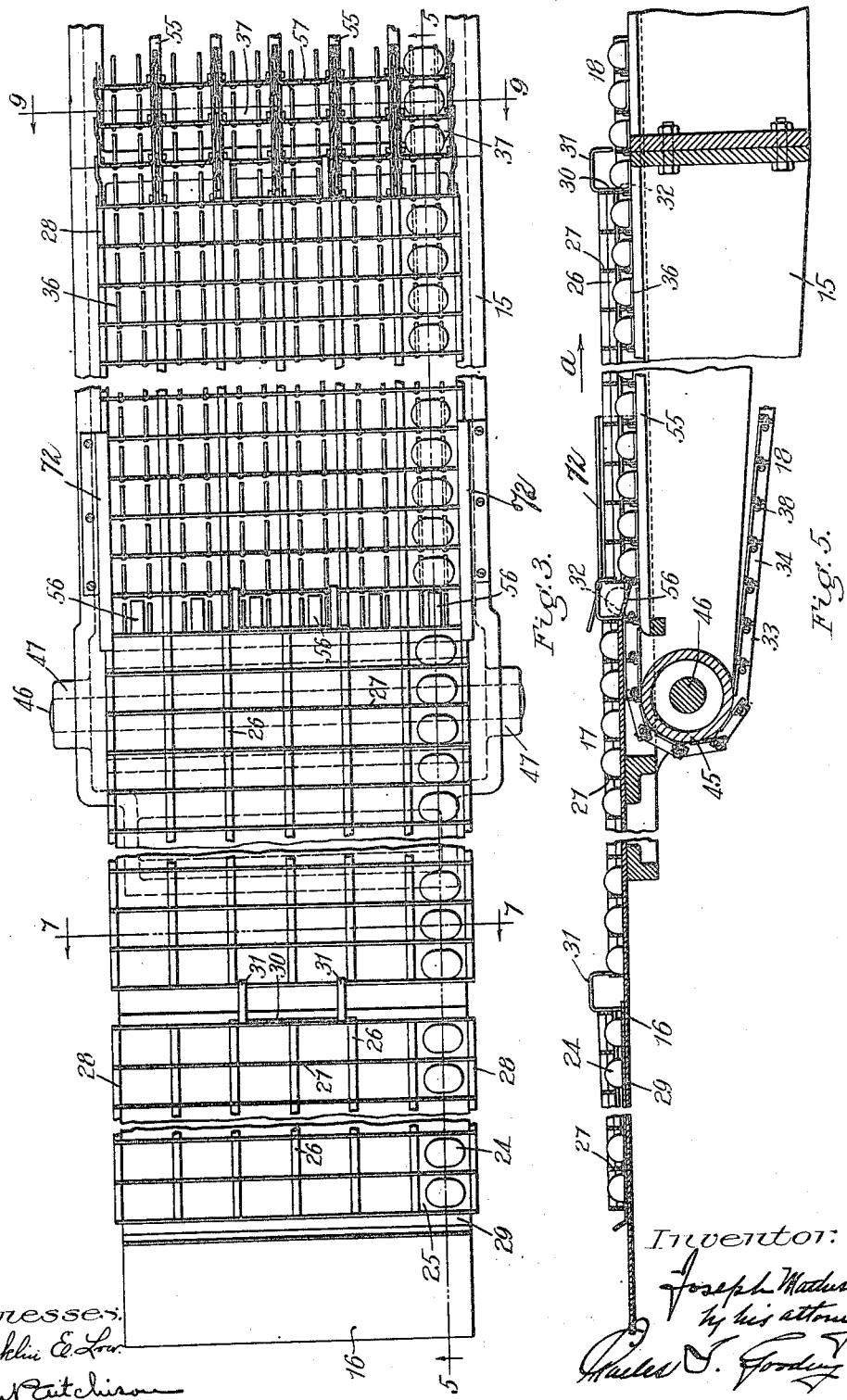

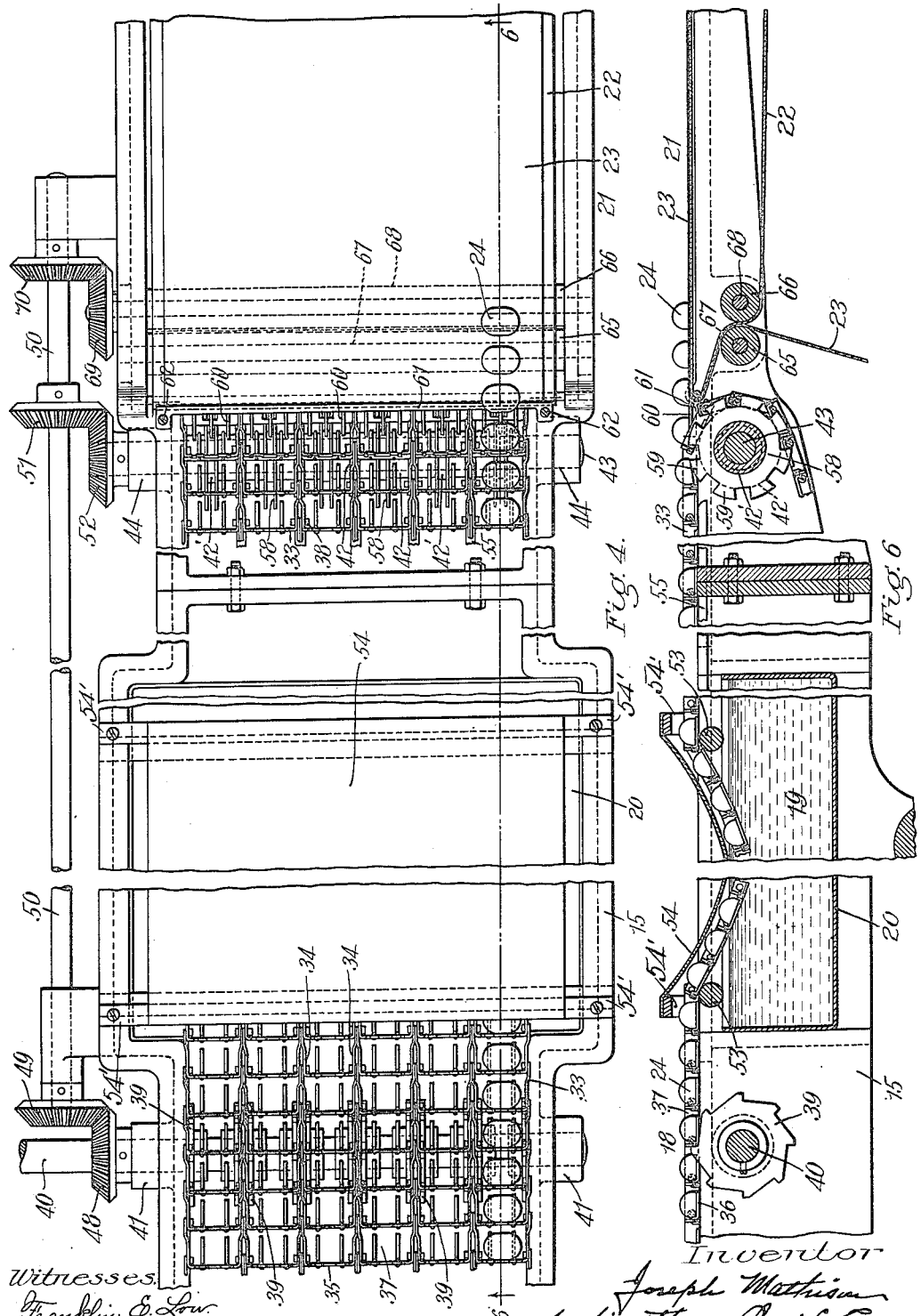

J. MATHISON.
CONFECTIONERY COATING MACHINE.
APPLICATION FILED DEC. 30, 1911.

1,032,014.

Patented July 9, 1912.
4 SHEETS—SHEET 4.

UNITED STATES PATENT OFFICE.

JOSEPH MATHISON, OF BOSTON, MASSACHUSETTS.

CONFECTIONERY-COATING MACHINE.

1,032,014. Specification of Letters Patent. Patented July 9, 1912.

Application filed December 30, 1911. Serial No. 668,663.

*To all whom it may concern:*

Be it known that I, JOSEPH MATHISON, a citizen of the United States, residing at Boston, in the county of Suffolk and State of Massachusetts, have invented new and useful Improvements in Confectionery-Coating Machines, of which the following is a specification.

This invention relates to a machine for coating pieces of confectionery with liquid chocolate and the like.

The object of the invention is to provide a machine in which a large number of pieces of confectionery may be coated within a short space of time and in which the machine is automatic—that is, after the pieces of confectionery have been placed on a table at one end of the machine, the machine will automatically feed these pieces of confectionery into a carrier, preferably a continuous conveyer, which will carry the pieces of confectionery into and through a tank containing liquid chocolate, or whatever liquid it may be desired to apply to the exterior of the pieces of confectionery, and will then take the pieces of confectionery after they have been coated and deliver them from the carrier chain or conveyer to a delivery belt, said delivery belt having upon its upper surface a strip of paper upon which the covered pieces of confectionery are placed by the mechanism, and this paper is torn off into strips by an attendant who places the finished confectionery in suitable receptacles provided therefor.

The invention consists in the combination and arrangement of parts set forth in the following specification and particularly pointed out in the claims thereof.

Figure 1:
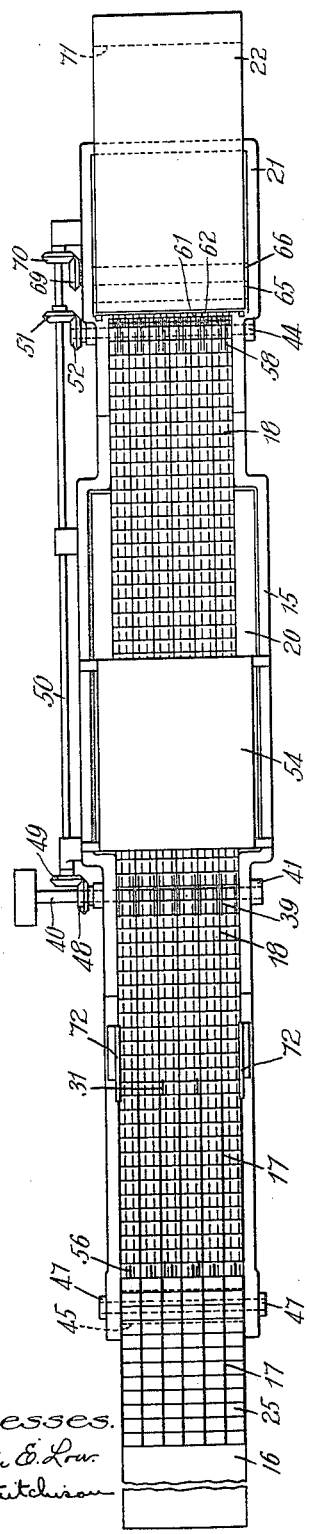
Figure 2:
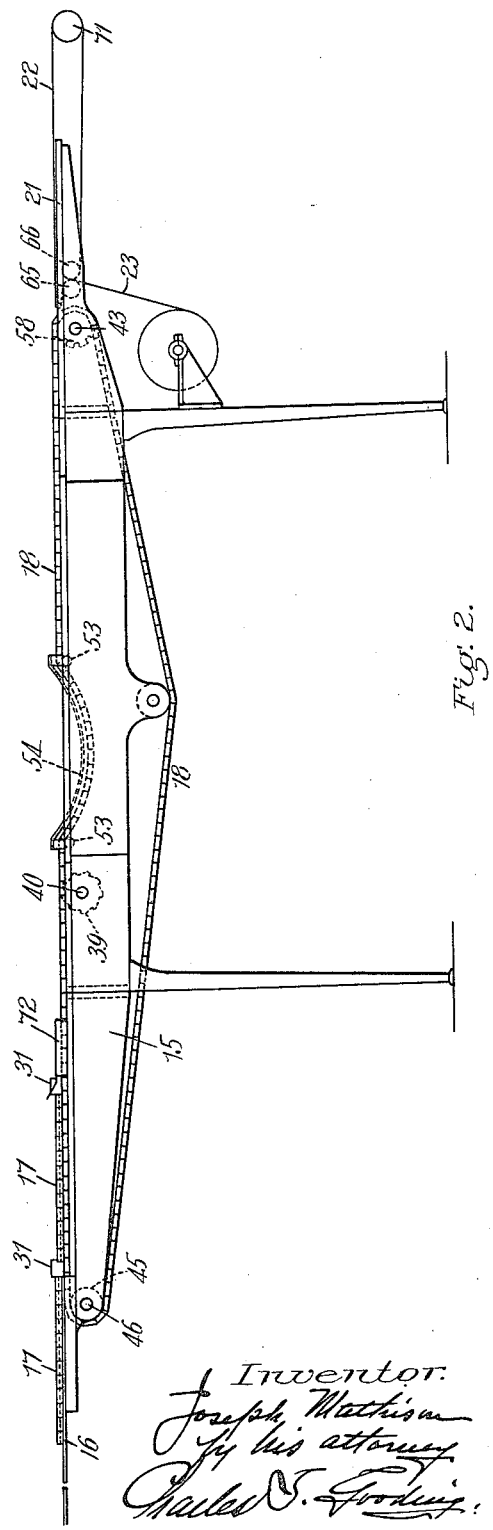
Figure 7:
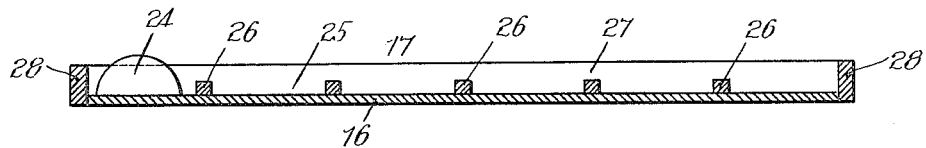
Figure 9:
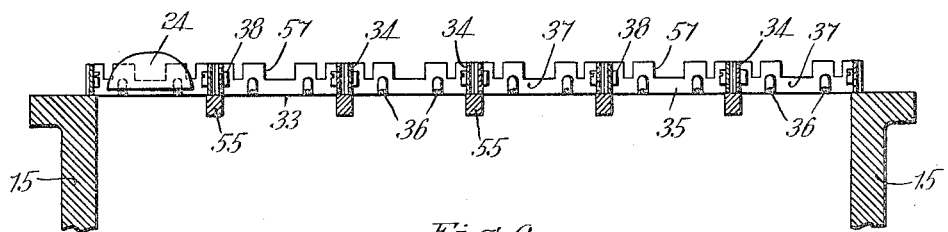
Figure 10:
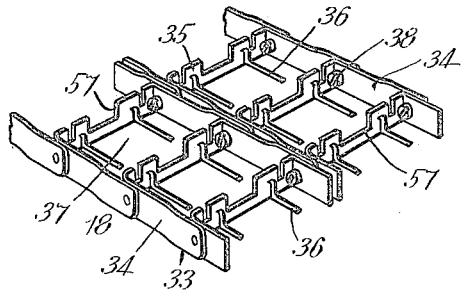
Figure 8:
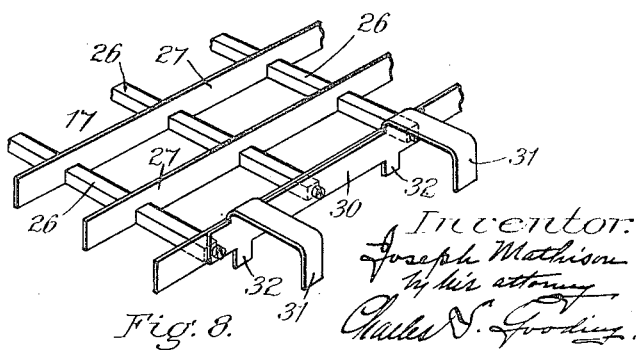

Referring to the drawings: Figure 1 is a diagrammatic plan view of my improved confectionery coating machine. Fig. 2 is a side elevation of the same. Figs. 3 and 4 are enlarged plan views of the machine broken away to save space in the drawings, the mechanism being of such a nature and so small in many of its parts that it has been impossible to illustrate the same on one sheet of drawings, and, therefore, Figs. 3 and 4 have been placed upon separate sheets, but when considered together form a plan view of the machine partly broken away. Fig. 5 is a sectional elevation taken on line 5—5 of Fig. 3. Fig. 6 is a sectional elevation taken on line 6—6 of Fig. 4. Fig. 7 is an enlarged sectional elevation taken on line 7—7 of Fig. 3. Fig. 8 is a perspective view of a portion of the end of a positioning tray. Fig. 9 is a sectional elevation taken on line 9—9 of Fig. 3. Fig. 10 is a perspective view of four links of a chain.

Like numerals refer to like parts throughout the several views of the drawings.

In the drawings, 15 is the frame of the machine, 16 is the receiving table; 17, 17 are positioning trays to receive pieces of chocolate or the like prior to the coating operation.

18 is the endless carrier which is utilized to carry the confectionery through the liquid chocolate 19 or the like which is contained within a tank 20.

21 is a delivery table, 22 an endless belt conveyer and 23 a strip of paper carried by said endless belt above the surface of the delivery table 21.

The pieces of confectionery 24 which are to be coated are placed in compartments 25, 25 formed in the trays 17. These compartments are open at the bottom thereof and the tray, as a whole, consists of longitudinal strips 26, 26, transverse strips 27, 27 and two longitudinally extending side strips 28, 28 (see Fig. 7). The tray 17 has a removable bottom piece 29 upon which the tray is placed prior to inserting the pieces of confectionery in the compartments 25, 25. The tray and the bottom piece are then laid upon the receiving table 16 of the machine and the bottom piece withdrawn, leaving the pieces of confectionery resting on the top of the table 16.

On the front of each tray 17 is provided a plate 30 with U-shaped arms 31, 31 (see Fig. 8) extending forwardly therefrom in the direction of the carrier 18. Said plate has also downwardly extending ears 32, 32. As will be seen by reference to Fig. 5, when the tray is placed upon the table 16, it is placed in such a position that the U-shaped arms 31 extend forwardly and downwardly into engagement with the rear transverse strip 27 of the tray in advance thereof, so that when one of the trays 17 is moved it will drag the tray immediately in the rear thereof along with it and along the surface of the table 16, the side strips 28, 28 projecting down upon the opposite edges of the table 16 and acting as guides for the trays 17 while they remain upon the table 16.

The table 16 is shown broken away in the drawings, but, as a matter of fact, it is of sufficient extent to hold several of the trays 17, 17, the hook-shaped arms 31 of each tray engaging the rear strip 27 of the tray in advance thereof.

The carrier 18, whereby the trays are transferred from the table and whereby the pieces of confectionery are carried forward and dipped in the liquid chocolate in the tank 20 consists, preferably, of a plurality of series of links 33, 33, each series of links being arranged side by side and constituting an endless chain carrier, and each of the links 33 constitutes a receptacle for one of said pieces of confectionery and comprises two side members 34, 34 (see Figs. 3, 4 and 10) rigidly joined together by an end member 35 forming a U. The end member 35 has two forwardly extending fingers 36, 36 fast thereto. These fingers act as supports for the pieces of confectionery when they are placed in the pockets 37, 37 in said carrier chain 18 in a manner hereinafter described. Pivots 38, 38 connect the free ends of the side members 34, 34 of each link to the side members of the link in advance thereof and to the side members of the link laterally adjacent thereto, as will be clearly seen by reference to Figs. 3, 4 and 10, so that the carrier 18, as a whole, consists of a plurality of series of links, each series of links constituting, in itself, a chain carrier.

Motion is imparted to the carrier chain 18 by a plurality of sprockets 39, 39 which are fastened to a shaft 40 journaled in bearings 41, 41 in the frame of the machine (see Figs. 4 and 6). These sprockets engage the end members 35 of the different links in the different series of chains and are placed immediately adjacent the side members 34, 34 of said chain, so that as the shaft 40 is rotated, said sprockets impart longitudinal movement to the carrier chain 18.

The carrier chain 18 passes around a drum 42 fast to a shaft 43 journaled in bearings 44, 44 in the frame of the machine, this rotary drum being arranged at the delivery end of the carrier chain, while the receiving end of the carrier chain passes around another drum 45 which is an idler and is fastened to a shaft 46 journaled to rotate in bearings 47, 47 in the frame of the machine.

40 is the main driving shaft of the machine and has fastened thereto a bevel gear 48 which meshes into a bevel gear 49 fast to another shaft 50 extending longitudinally of the machine and having fastened thereto another bevel gear 51 which meshes into a bevel gear 52 fast to the shaft 43, whereby rotary motion is imparted to said shaft 43.

The carrier 18, as it passes downwardly into the tank 19, is guided upon its under side by rollers 53, 53 and is guided upon its upper side by a curved plate 54 which extends over the tank 19 above the rolls 53, 53 and is supported at opposite ends thereof upon brackets 54', 54', said brackets being fastened to the side frames of the machine. As the carrier chain passes along the frame of the machine to carry the pieces of confectionery into the tank and dip them in the liquid chocolate, it is supported upon longitudinally extending strips 55, 55 fast to the frame of the machine (see Figs. 3, 5 and 9). As the carrier chain moves in the direction of the arrow $a$ (Fig. 5) the downwardly extending ears 32, 32 upon the front of the trays 17, 17 will be engaged by the end members 35, 35 of the carrier chain 18, as will be clearly seen by reference to Fig. 5, and the tray 17 will be pulled along the surface of the table 16, pushing the pieces of confectionery along the top of said table until they successively arrive at the front edge of said table and slide down fingers 56, 56 which are fast to the front edge of the receiving table 16 and act as guides down which the pieces of confectionery slide, dropping from the ends of said fingers into the pockets 37, 37 in the carrier chain and upon the fingers 36, 36 at the bottom of said pockets in said chain.

In Fig. 5, one of the pieces of confectionery is indicated in dotted lines in the position it will assume as it slides down the guide fingers 56, 56. It will be understood, therefore, that the pieces of confectionery 24, 24 having been placed in the tray 17, said tray, together with the removable bottom 29, is placed on the table 16, with the arms 31, 31 engaging the rear strip of the tray next in advance thereof. These different trays which rest upon the table 16 are therefore connected to each other by their respective arms 31, 31 and they are pulled forward by the transversely extending end members 35, 35 of the series of carrier chains engaging the ears 32 on the tray at the end of the table adjacent the carrier chain, as will be seen by reference to Fig. 5, and as said carrier chain advances the different pieces of confectionery in the tray pass down the fingers 56 and are deposited in the pockets of the carrier chain as said carrier chain advances, the fingers 56 being inclined downwardly and projecting through notches 57, 57 provided in the end members 35 of the carrier chain, as will be clearly seen in Fig. 10. As soon as the carrier chain has engaged the ears on one of the trays, as hereinbefore set forth, the tray in advance thereof may be removed from the carrier chain by tipping the same upwardly at the end farthest removed from the receiving table, and disengaging its end member from the arms 31, 31. The carrier chain now proceeds forwardly in the direction of the arrow $a$ and is carried downwardly into the liquid 19 in the tank 20, being guided by the rolls 53, 53 and the curved plate 54.

When the carrier chain arrives at the end adjacent the delivery table, the pieces of confectionery are lifted from the pockets 37 by a series of rotary members 58, 58 provided upon their peripheries with teeth 59. These rotary members are mounted upon the shaft 43 and consist of thin disks of metal interposed between the collars 42', 42', which collars, as a whole, constitute the drum 42. The pieces of confectionery 24 are lifted by the teeth 59, as seen in Fig. 6, and are carried by said teeth forwardly onto a series of fingers 60, 60 constituting a rack 61 which is fastened by screws 62 to the frame of the machine (see Fig. 4). Said rack and delivery fingers constitute, in effect, a portion of the delivery table, said rack and delivery fingers being stationary and located at the end of said delivery table which is adjacent to the delivery end of the carrier 18. The pieces of confectionery are further pushed along the fingers 60 by the transversely extending end members 35 of the carrier chain until they are landed upon a strip of paper 23 which is carried forward in the direction of the arrow *a* by a continuous delivery belt 22. Said delivery belt is driven by friction rolls 65, 66 between which said belt and also the strip of paper 23 pass. The rolls 65 and 66 are fastened to shafts 67 and 68, respectively, the shaft 68 being rotated by a bevel gear 69 fast thereto and meshing into another bevel gear 70 fast to the shaft 50. The delivery belt 22, together with the piece of paper 23, moves along the top of the delivery table and said belt returns around a roll 71, thence passing between the rolls 65 and 66. The pieces of confectionery 24, 24, after having been fed upon the paper 23, are carried by said paper and by the conveyer belt 22 along the delivery table until the required number of pieces of confectionery are located thereon, when the piece of paper is severed and removed by the operator and the confectionery packed in suitable boxes.

The general operation of the machine hereinbefore described specifically and also to a great extent in general is as follows: The confectionery is placed in the trays 17, and the trays, with the removable bottoms 29, are placed upon the table 16 and hooked together by means of the arms 31. These trays are carried from the table onto the carrier by the engagement of the end members 35 of the chain carrier with said ears 32. As the chain advances in the direction of the arrow *a*, the trays are pulled along the table and are successively landed upon the chain, while the pieces of confectionery slide through the bottoms of the compartments of the trays into the pockets in the carrier chain. As the tray passes from the table to the chain, as hereinbefore described, it is guided downwardly upon the chain and held downwardly thereon while passing from the table to the chain by guides 72, 72 (Figs. 3 and 5). These guides are supported upon the side frames of the machine and project over the opposite ends, respectively, of the tray, so that as said tray is pulled forward, as hereinbefore described, and is passing from the table to the chain, the guides 72, 72 will hold said tray downwardly in position on the chain and after the chain has passed along far enough to carry the tray beyond the guides 72, 72 and the contents of the tray emptied, as hereinbefore described, said tray is removed from the chain and the chain carries the pieces of confectionery down into the liquid in the tank, and upon further movement forward the pieces of confectionery are taken by the teeth 59 of the rotary members 58 and landed upon the fingers 60 of the rack 61. The transversely extending end members 35 of the chain serve to still further push forward the pieces of confectionery until they are transferred to the paper strip 23, which is fed forward by the delivery belt 22, and a piece of said paper strip is then cut from the main portion of the paper strip, with the pieces of coated confectionery thereon, and removed from the machine.

Having thus described my invention, what I claim and desire by Letters Patent to secure is:

1. A machine for coating pieces of confectionery having, in combination, an endless carrier, a tray adapted to receive pieces of confectionery, a table upon which said tray may be placed, said carrier adapted to engage said tray and transfer the same, together with the pieces of confectionery therein, from said table to said carrier.

2. A machine for coating pieces of confectionery having, in combination, an endless carrier, a tray having a plurality of compartments each adapted to receive a piece of confectionery, a table upon which said tray may be placed, said carrier adapted to engage said tray and transfer the same, together with the pieces of confectionery therein, from said table to said carrier.

3. A machine for coating pieces of confectionery having, in combination, a tank adapted to contain liquid, an endless carrier, means to guide said carrier into said tank, a tray adapted to receive pieces of confectionery, and a table upon which said tray may be placed, said carrier adapted to engage said tray and transfer the same, together with the pieces of confectionery therein, from said table to said carrier.

4. A machine for coating pieces of confectionery having, in combination, an endless carrier, a plurality of trays adapted to receive pieces of confectionery, means connecting said trays one to the other successively, and a table upon which said trays may be placed, said carrier adapted to engage one of said trays and transfer said trays, together with the confectionery therein, from said table to said carrier.

5. A machine for coating pieces of confectionery having, in combination, an endless carrier, a plurality of trays, each of said trays having a plurality of compartments, each compartment adapted to receive a piece of confectionery, means connecting said trays one to the other successively and a table upon which said trays may be placed, said carrier adapted to engage one of said trays and transfer said trays, together with the confectionery therein, from said table to said carrier.

6. A machine for coating pieces of confectionery having, in combination, an endless carrier, a plurality of trays adapted to receive pieces of confectionery, means connecting said trays one to the other successively, a table upon which said trays may be placed, said carrier adapted to engage said trays successively and transfer said trays, together with the confectionery therein, from said table to said carrier.

7. A machine for coating pieces of confectionery having, in combination, an endless carrier, a plurality of trays adapted to receive pieces of confectionery, each of said trays detachably connected to the tray adjacent thereto and a table upon which said trays may be placed, said carrier adapted to engage said trays successively and transfer said trays, together with the confectionery therein, from said table to said carrier.

8. A machine for coating pieces of confectionery having, in combination, an endless carrier, a tray adapted to receive pieces of confectionery, said tray having openings in the bottom thereof through which said pieces may pass, and a table upon which said tray may be placed, said carrier adapted to engage said tray and transfer the same, together with the pieces of confectionery therein, from said table to said carrier.

9. A machine for coating pieces of confectionery having, in combination, an endless carrier, a tray adapted to receive pieces of confectionery, said tray having openings in the bottom thereof through which said pieces may pass, a table upon which said tray may be placed, and guide fingers extending from the edge of said table over said carrier and in alinement therewith, said carrier adapted to engage said tray and transfer the same from said table to said carrier, whereby said pieces of confectionery may be moved along said table and guide fingers and onto said carrier.

10. A machine for coating pieces of confectionery having, in combination, an endless carrier consisting of a series of links, each link constituting a receptacle for one of said pieces of confectionery and comprising two side members rigidly joined together by an end member forming a U and fingers rigidly fastened to said end member and extending longitudinally of said carrier, said side and end members extending substantially above said fingers and forming with said fingers a U-shaped pocket adapted to contain and partly surround one of said pieces of confectionery.

11. A machine for coating pieces of confectionery having, in combination, an endless carrier consisting of a series of links, each link constituting a receptacle for one of said pieces of confectionery and comprising two side members rigidly joined together by an end member forming a U, fingers fast to said end member and extending longitudinally of said carrier and pivots connecting the free ends of said side members to the side members of the link in advance thereof adjacent to the end member of said last-named link, said side and end members extending substantially above said fingers and forming pockets each of said pockets respectively adapted to contain and surround one of said pieces of confectionery.

12. A machine for coating pieces of confectionery having, in combination, an endless carrier consisting of a plurality of series of links side by side, each link constituting a receptacle for one of said pieces of confectionery and comprising two side members rigidly joined together by an end member forming a U and fingers fast to said end member extending longitudinally of said carrier said side and end members extending substantially above said fingers and forming with said fingers a U-shaped pocket adapted to contain and partly surround one of said pieces of confectionery and pivots connecting the free ends of said side members to the side members of the link in advance thereof and to the side members of the links laterally adjacent thereto.

13. A machine for coating pieces of confectionery having, in combination, an endless carrier, a tray adapted to receive pieces of confectionery, a receiving table upon which said tray may be placed, said carrier adapted to engage said tray and transfer the same, together with the pieces of confectionery therein, from said table to said carrier, a tank adapted to contain liquid, means to guide said carrier into said tank, a delivery table and means adapted to transfer said pieces of confectionery from said carrier to said delivery table.

14. A machine for coating pieces of confectionery having, in combination, an endless carrier having pockets therein, each adapted to receive a piece of confectionery, a delivery table including a rack with fingers thereon projecting longitudinally of said pockets and above the delivery ends of said carrier and means adapted to project upwardly into said pockets and coöperate with said carrier to deliver said pieces of confectionery from said carrier to said delivery table rack.

15. A machine for coating pieces of confectionery having, in combination, an endless carrier having pockets therein, each adapted to receive a piece of confectionery, a delivery table including a rack with fingers thereon projecting longitudinally of said pockets and above the delivery ends of said carrier, an endless delivery belt and means adapted to project upwardly into said pockets and coöperate with said carrier to deliver said pieces of confectionery from said carrier to said delivery table rack and to move said pieces of confectionery along said delivery table rack onto said delivery belt.

16. A machine for coating pieces of confectionery having, in combination, an endless carrier embodying transversely extending members and having pockets therein, each pocket adapted to receive a piece of confectionery, an endless delivery belt, a delivery table including a rack with fingers thereon projecting longitudinally of said pockets and above the delivery ends of said carrier and a rotary member having teeth on its periphery adapted to project upwardly into said pockets and coöperate with said transversely extending members to deliver said pieces of confectionery from said pockets onto said delivery table rack and to move said pieces of confectionery along said rack onto said delivery belt.

17. A machine for coating pieces of confectionery having, in combination, an endless carrier consisting of a series of links, each link constituting a receptacle for one of said pieces of confectionery and comprising two side members rigidly joined together by an end member forming a U, fingers fast to said end member and extending longitudinally of said carrier, a delivery table adjacent one end of said carrier having fingers projecting toward said carrier and a rotary member having teeth in its periphery adapted to project upwardly between said side members and between the fingers on said table, whereby said pieces of confectionery may be transferred from said carrier to said fingers.

18. A machine for coating pieces of confectionery having, in combination, an endless carrier consisting of a series of links, each link constituting a receptacle for one of said pieces of confectionery and comprising two side members rigidly joined together by an end member forming a U, fingers fast to said end member and extending longitudinally of said carrier, a delivery table adjacent one end of said carrier having fingers projecting toward said carrier and longitudinally thereof, an endless conveyer belt adjacent to the fingers on said table and a rotary member having teeth in its periphery adapted to project upwardly between the side members of said carrier and between the fingers on said table, whereby said pieces of confectionery may be transferred from said carrier to said fingers and moved along said fingers onto said endless conveyer belt.

19. A machine for coating pieces of confectionery having, in combination, an endless carrier having pockets therein each adapted to receive a piece of confectionery, a tray adapted to receive pieces of confectionery, said tray having openings in the bottom thereof through which said pieces may pass, a table upon which said tray may be placed, said carrier adapted to engage said tray and transfer the same, together with the pieces of confectionery therein, from said table to said carrier, whereby said pieces of confectionery may pass through the openings in the bottom of said tray into said pockets in said carrier, a tank adapted to contain liquid, means to guide said carrier into said tank, a delivery table, and a rotary member adapted to project upwardly into said pockets and coöperate with said carrier to deliver said pieces of confectionery from said pockets onto said delivery table.

In testimony whereof I have hereunto set my hand in presence of two subscribing witnesses.

JOSEPH MATHISON.

Witnesses:
CHARLES S. GOODING,
SYDNEY E. TAFT.